United States Patent
Palmas et al.

(10) Patent No.: US 9,587,824 B2
(45) Date of Patent: Mar. 7, 2017

(54) CATALYST COOLER FOR REGENERATED CATALYST

(71) Applicant: UOP LLC, Des Plaines, IL (US)

(72) Inventors: Paolo Palmas, Des Plaines, IL (US); Daniel N. Myers, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/566,035

(22) Filed: Dec. 10, 2014

(65) Prior Publication Data

US 2016/0169506 A1    Jun. 16, 2016

(51) Int. Cl.
*B01J 21/20* (2006.01)
*F23C 13/00* (2006.01)
*B01J 38/12* (2006.01)
*F23C 10/01* (2006.01)

(52) U.S. Cl.
CPC ............. *F23C 13/00* (2013.01); *B01J 38/12* (2013.01); *F23C 10/01* (2013.01)

(58) Field of Classification Search
CPC ... B01J 21/20; B01J 23/90; B01J 25/04; B01J 27/28; B01J 29/90; B01J 31/40
USPC .......................................................... 502/20
See application file for complete search history.

(56) References Cited

U.S. PATENT DOCUMENTS

| | | |
|---|---|---|
| 4,690,802 A | 9/1987 | Jenkinson |
| 5,128,292 A | 7/1992 | Lomas |
| 5,209,287 A | 5/1993 | Johnson et al. |
| 5,409,872 A | 4/1995 | Raterman |
| 8,062,599 B2 | 11/2011 | Miller |
| 8,609,566 B2 | 12/2013 | Palmas et al. |
| 2013/0310244 A1 | 1/2013 | Hemler, Jr. |

OTHER PUBLICATIONS

Chan et al., "Advances in a catalyst cooler technology," PTQ (1999), 4th Quarter, 1-5.
Search Report dated Jun. 6, 2016 for corresponding PCT International Application No. PCT/2015/063596.

*Primary Examiner* — Edward Johnson

(57) ABSTRACT

A catalyst cooler for cooling regenerated catalyst in a regenerator associated with a fluid catalytic cracking unit. The catalyst cooler includes a first passage for transporting hot regenerated catalyst away from the regenerator and a second passage for returning cooled regenerated catalyst to the regenerator. The catalyst cooler also includes at least one heat exchanger. The second passage may be disposed within the first passage, or the first and second passage may each occupy a portion of a horizontal cross section of the catalyst cooler.

17 Claims, 4 Drawing Sheets

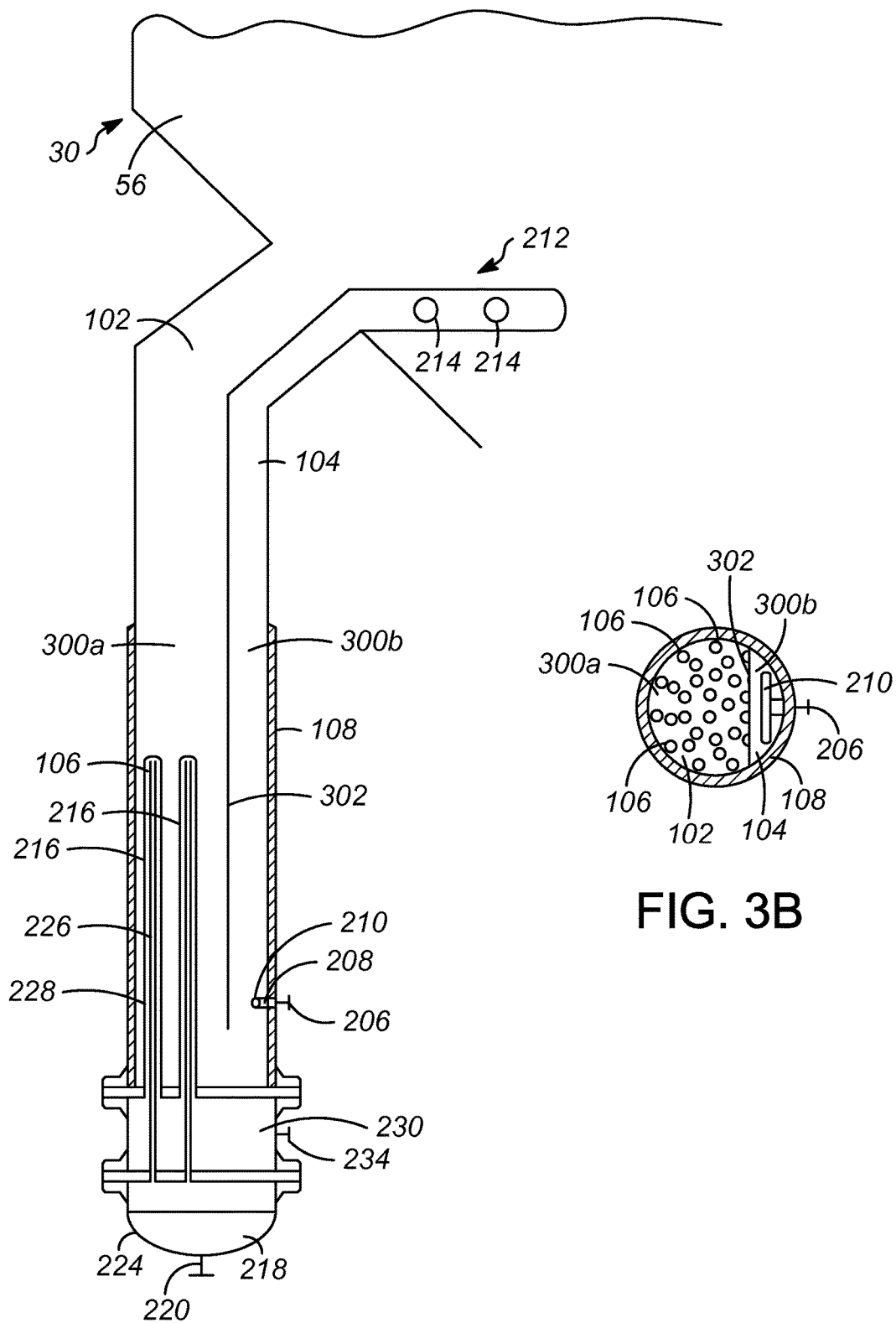

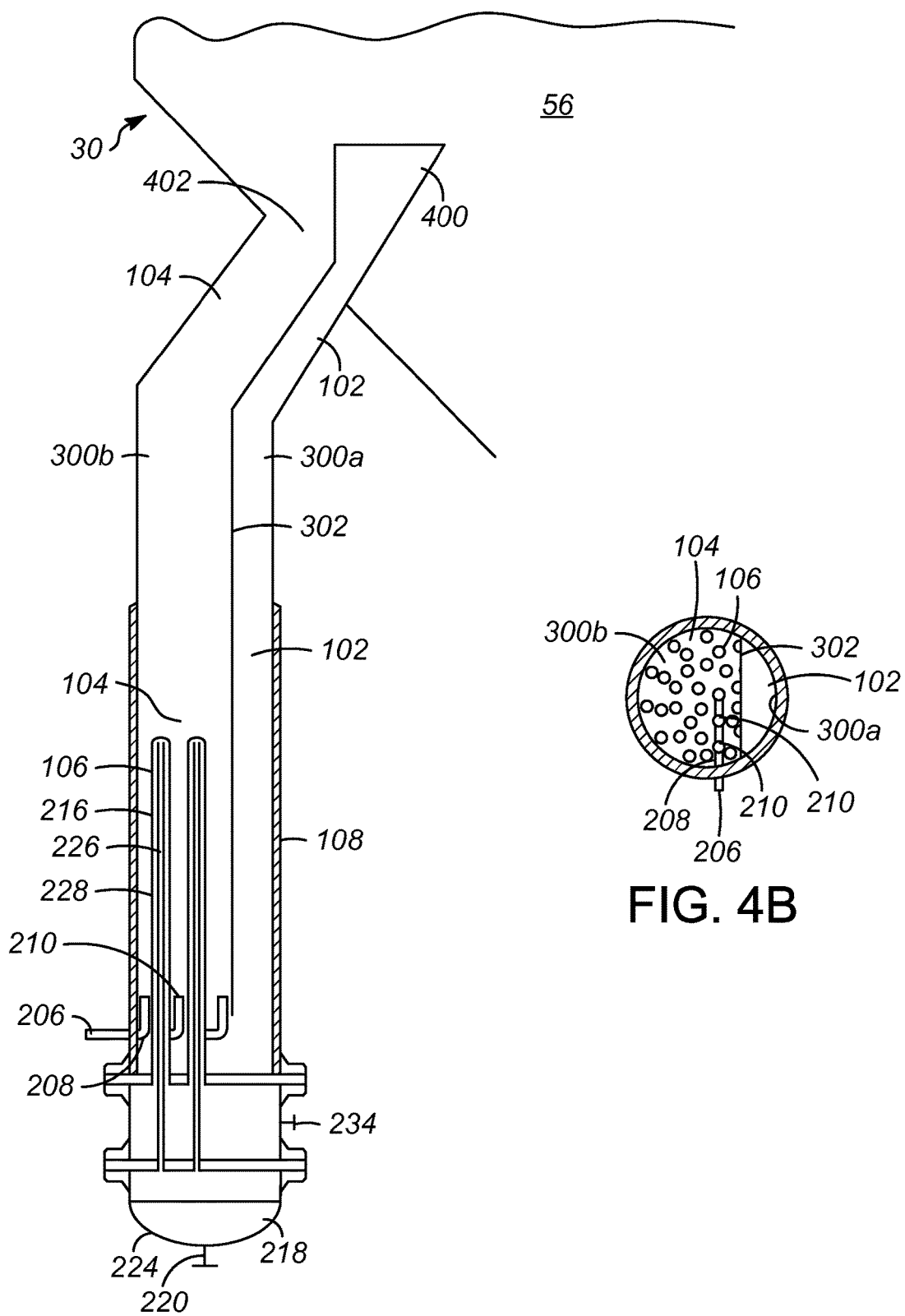

CATALYST COOLER FOR REGENERATED CATALYST

FIELD OF THE INVENTION

This invention relates generally to a cooler for regenerated catalyst, and more particular to a process for cooling regenerated catalyst in an FCC processing unit, and a cooler for the regenerated catalyst.

BACKGROUND OF THE INVENTION

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst. A high temperature regeneration operation within a regenerator zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone.

Many regeneration zones typically include a regenerator having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel.

There are several types of regenerators in use today. One such regenerator is a bubbling bed regenerator that provides a single chamber in which air is bubbled through a dense catalyst bed. Coked catalyst is added and regenerated catalyst is withdrawn from the same dense catalyst bed. Relatively little catalyst is entrained in the combustion gas exiting the dense bed.

Other types of regenerators have two chambers. For example, two-stage bubbling beds have two chambers. Coked catalyst is added to a dense bed in a first, upper chamber and is partially regenerated with air. The partially regenerated catalyst is transported to a dense bed in a second, lower chamber and completely regenerated with air. The completely regenerated catalyst is withdrawn from the second chamber.

Another two chambered regenerator allows for complete catalyst regeneration to be performed in a dilute phase, fast-fluidized, combustion regenerator. In such a regenerator, coked catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are disengaged from each other. Only a small proportion of air added to the regenerator vessel is added to the upper chamber. U.S. Pat. No. 4,197,189 and U.S. Pat. No. 4,336,160 teach a riser combustion zone in which fast fluidized flow conditions are maintained to effect complete combustion without the need for the additional combustion in the catalyst bed collected from the top of the riser.

After burn is a phenomenon that occurs when hot flue gas that has been separated from regenerated catalyst contains carbon monoxide that combusts to carbon dioxide. After burn can be a risk in an upper, disengaging chamber which contains hot flue gas that has been disengaged from catalyst, thereby providing a dilute catalyst phase. In this dilute phase of catalyst, insufficient catalyst is present to serve as a heat sink to absorb the heat of combustion thus subjecting surrounding equipment to potentially damaging higher temperatures and perhaps creating an atmosphere conducive to the generation of nitrous oxides.

In order to lower the temperature of the catalyst, catalyst coolers have been used to cool regenerated catalyst and permit the regenerator and the reactor to operate under independent conditions. In catalyst coolers, hot regenerated catalyst is cooled by indirect heat exchange with water which vaporizes to steam. The steam is removed from the catalyst cooler for other uses; whereas, the cooled catalyst is returned to the regenerator. Air used to fluidize catalyst in the catalyst cooler can be vented to the regenerator.

U.S. Pat. No. 8,609,566 discloses an FCC unit with a regenerator having such a catalyst cooler. While effective for its intended purpose, the catalyst cooler requires an external return standpipe for the cooled catalyst to be returned to the regenerator. The standpipe typically requires a slide valve and expansion joint which increases the capital costs associated with such a cooler. Additionally, in some instances, the area around the FCC unit is limited in the amount of available length for the cooler, making such a design difficult to implement.

Therefore, it would be desirable to provide a catalyst cooler that does not require a separate standpipe and which provides an effective and efficient cooler for regenerated catalyst.

SUMMARY OF THE INVENTION

Various catalyst coolers have been invented which utilize a "flow through" design having a first passage for receiving hot regenerated catalyst, a second passage for returning cooled regenerated catalyst. One or more heat exchangers are disposed in at least one of the two passages to remove heat from the catalyst. Such a design does not require an external standpipe or excess space for the FCC unit.

Therefore, in a first aspect of the present invention, the present invention may be generally characterized as providing a regenerator for regenerating spent catalyst particles in which the regenerator comprises: an inlet for spent catalyst particles; an outlet for regenerated catalyst particles; and an air distributor disposed below a bed of catalyst particles configured to supply combustion air into the regenerator for combusting coke on the spent catalyst particles to provide the regenerated catalyst particles. The regenerator also includes a cooling zone for removing heat from the regenerated catalyst. The cooling zone comprises a first passage for receiving regenerated catalyst, a second passage for returning cooled regenerated catalyst to a chamber of the regenerator, and at least one heat exchanger for removing heat from the regenerated catalyst. Each heat exchanger in the cooling zone is disposed in at least one of the first passage and the second passage.

In at least one embodiment of the present invention, the first passage comprises a conduit disposed within the second passage.

In some embodiments of the present invention, the second passage comprises a conduit disposed within the first passage.

In various embodiments of the present invention, the first passage and the second passage each comprise a portion of a single shell.

In one or more embodiments of the present invention, each heat exchanger includes a longitudinal axis and the longitudinal axis of each heat exchanger is generally parallel to a flow path of the regenerated catalyst through the first passage.

In some embodiments of the present invention, the catalyst cooler further comprises an outlet for a lift gas. It is contemplated that the outlet is disposed within the second passage.

In one or more embodiments of the present invention, the second passage includes an arm with a plurality of outlets for dispensing cooled catalyst into the regenerator.

In at least one embodiment of the present invention, the least one heat exchanger comprises a steam generator.

In a second aspect of the present invention, the present invention may be generally characterized as providing a regenerator for regenerating spent catalyst particles in which the regenerator comprises an inlet for spent catalyst particles, an outlet for regenerated catalyst particles, and an air distributor disposed below a bed of catalyst particles configured to supply combustion air into the regenerator for combusting coke on the spent catalyst particles to provide the regenerated catalyst particles. The regenerator also includes a catalyst cooler disposed beneath the bed of catalyst particles. The catalyst cooler comprises a first passage for hot regenerated catalyst, at least one heat exchanger for removing heat from the hot regenerated catalyst to provide a cooled regenerated catalyst, and a second passage for passing the cooled regenerated catalyst to the bed of catalyst particles.

In one or more embodiments of the present invention, the catalyst cooler further comprises an inlet for lift gas configured to transport the cooled regenerated catalyst to the bed of catalyst particles.

In some embodiments of the present invention, the second passage includes an arm disposed in the bed of catalyst particles.

In various embodiments of the present invention, the second passage is disposed within the first passage so as to define an annulus. It is contemplated that the at least one heat exchanger is disposed within the annulus.

In at least one embodiment of the present invention, the second passage is disposed within the first passage, and the at least one heat exchanger is disposed within the first passage.

In some embodiments of the present invention, the catalyst cooler has a circular horizontal cross-section, and the first passage and the second passage each comprise a portion of the circular horizontal cross section separated by a baffle. It is further contemplated that the first passage and the second passage have differently sized horizontal cross sections.

In a third aspect of the present invention, the invention may be generally characterized as a process for cooling regenerated catalyst by: passing spent catalyst to a regenerator, the regenerator including an air distributor disposed below a bed of catalyst; combusting coke on the spent catalyst to provide a regenerated catalyst; passing a regenerated catalyst from the bed of catalyst to a catalyst cooler via a first passage; removing heat from the regenerated catalyst via a heat exchanger to provide a cooled regenerated catalyst; and, passing the cooled regenerated catalyst to the bed of catalyst in a second passage, the second passage parallel to the first passage.

In one or more embodiments of the present invention, the process further includes passing the cooled regenerated catalyst from the first chamber to the second chamber with a lift gas. It is also contemplated that one of the first passage and the second passage is disposed within the other of the first passage and the second passage.

Additional objects, embodiments, and details of the invention are set forth in the following detailed description of the invention.

DETAILED DESCRIPTION OF THE DRAWINGS

In the drawings of the present invention, one or more embodiments are shown in which like numerals denote like elements, and in which:

FIG. 3A shows a side perspective schematic view of another catalyst cooler according to one or more embodiments of the present invention;

FIG. 3B shows a top view of the catalyst cooler shown in FIG. 3A;

FIG. 4A shows a side perspective schematic view of another catalyst cooler according to various embodiments of the present invention; and, FIG. 4B shows a top view of the catalyst cooler shown in FIG. 4A.

DETAILED DESCRIPTION OF THE INVENTION

As discussed above, various catalyst coolers have been invented which provide an effective and efficient design for cooling catalyst without requiring an external standpipe in a regenerator of an FCC unit. Not only will such a design lower the capital cost of an FCC unit, but it will minimize the amount of space needed for the regenerator of the FCC unit.

With reference to the attached drawings, one or more embodiments of the present invention will now be described with the understanding that the described embodiment are merely exemplary of the aspects and principles of the present invention and are not intended to be limiting.

Figure 1:
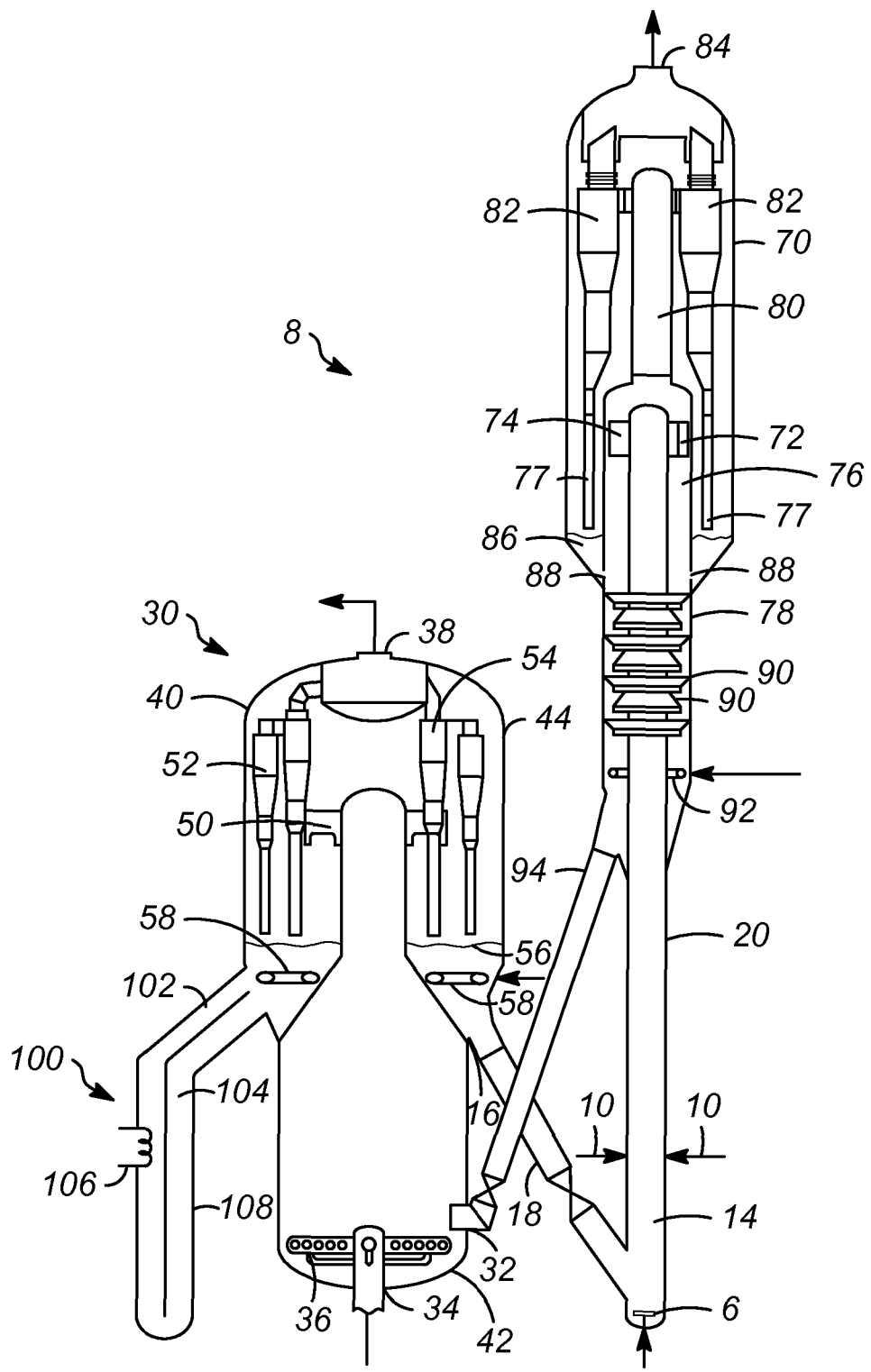
FIG. 1 shows a schematic drawing of an FCC unit that may be used in accordance with the present invention.

As discussed above, the various catalyst coolers of the present invention are typically used in association of a regenerator of an FCC unit. As shown in FIG. 1, an exemplary FCC unit 8 is shown. As is known, a hydrocarbon feedstock may be sprayed by distributors 10 into a riser 20 where it contacts catalyst. In general, feedstock may be cracked in the riser 20 in the presence of catalyst to form a cracked product stream. A conventional FCC feedstock is a suitable feed to the riser 20. The most common of such conventional feedstocks is a "vacuum gas oil" (VGO), which is typically a hydrocarbon material having a boiling range of from 343° to 552° C. (650° to 1025° F.) prepared by vacuum fractionation of atmospheric residue. A heavier hydrocarbon feedstocks may also be used in the present invention. The feedstock may be vaporized and sprayed in the riser by the distributors 10.

The riser 20 may operate with catalyst-to-feed ratio of between about 4 and about 12, preferably between about 4 and about 10. Inert gas, via a lift gas distributor 6, that is passed to the riser 20 may be between about 1 and about 15 wt % of hydrocarbon feed, preferably between about 4 and about 12 wt %. Before contacting the catalyst, the hydrocarbon feed may have a temperature in a range of from about 149° to about 427° C. (300 to 800° F.), preferably between about 204° and about 288° C. (400° and 550° F.). The riser 20 may operate in a temperature range of between about 427° and 649° C. (800° and 1200° F.), preferably between about 482° and about 593° C. (900° and 1100° F.). The pressure in the riser 20 may be between about 69 and about 310 kPa (gauge) (10 and 45 psig), preferably at about 140 kPa (gauge) (20 psig).

As shown in FIG. 1, regenerated catalyst is delivered to the riser 20 from regenerator standpipe 18. The zeolitic molecular sieves used in typical FCC operation have a large average pore size and are suitable for the present invention. Molecular sieves with a large pore size have pores with openings of greater than 0.7 nm in effective diameter defined by greater than 10 and typically 12 membered rings. Suitable large pore molecular sieves include synthetic zeolites such as X-type and Y-type zeolites, mordenite and faujasite. Y-type zeolites with low rare earth content are preferred. Low rare earth content denotes less than or equal to about 1.0 wt-% rare earth oxide on the zeolitic portion of the catalyst. Catalyst additives may be added to the catalyst composition during operation. Medium pore sized molecular sieves such as MFI with openings of 0.7 nm or less may be blended in with the large pore molecular sieves to increase production of lighter olefins. In some cases, only medium pore sized molecular sieves may be used if the feed to the riser is an FCC product cut such as a naphtha stream.

In an embodiment, lift gas which may include inert gas such as steam may be distributed by lift gas distributor 6 to lift catalyst upwardly from a lower section 14 of the riser 20. Feed sprayed from a distributor 10 contacts lifted, fluidized catalyst and moves upwardly in the riser 20 as the hydrocarbon feed cracks to smaller hydrocarbon cracked products. The cracked products and spent catalyst enter the reactor vessel 70 and are then discharged from the top of the riser 20 through the riser outlet 72 and separated into a cracked product vapor stream and a collection of catalyst particles covered with substantial quantities of coke and generally referred to as spent catalyst. A swirl arm arrangement 74, provided at the end of the riser 20, may further enhance initial catalyst and cracked hydrocarbon separation by imparting a tangential velocity to the exiting catalyst and cracked product vapor stream mixture. The swirl arm arrangement 74 is located in an upper portion of a separation chamber 76, and a stripping zone 78 is situated in the lower portion of the separation chamber 76. Catalyst separated by the swirl arm arrangement 74 drops down into the stripping zone 78.

The cracked product vapor stream comprising cracked hydrocarbons including naphtha, light olefins and some catalyst may exit the separation chamber 76 via a gas conduit 80 in communication with one or more cyclones 82. The cyclones 82 may remove remaining catalyst particles from the product vapor stream to reduce particle concentrations to very low levels. The product vapor stream may exit the top of the reactor vessel 70 through a product outlet 84. Catalyst separated by the cyclones 82 returns to the reactor vessel 70 through diplegs 77 into a dense bed 86 where catalyst will pass through chamber openings 88 and enter a stripping zone 78.

The stripping zone 78 facilitates removal of adsorbed and entrained hydrocarbons from the catalyst by counter-current contact of the falling catalyst particles with inert gas such as steam over the optional baffles 90. For example, steam may enter the stripping zone 78 through a distributor 92. A spent catalyst conduit 94 transfers coked catalyst, regulated by a control valve, to a catalyst regenerator 30. Although not shown, it is contemplated that some spent catalyst is recycled back to the riser 20 below the feed distributor arrangement 10 without undergoing regeneration.

As shown in FIG. 1, the catalyst regenerator 30 receives the coked catalyst through an inlet 32 and typically combusts the coke from the surface of the catalyst particles by contact with an oxygen-containing gas. The oxygen-containing combustion gas enters the bottom of the regenerator 30 via an inlet 34 to a combustion gas (or air) distributor 36. Flue gas and entrained catalyst pass upwardly through the regenerator 30. Flue gas exits the regenerator 30 through a flue gas outlet 38.

The catalyst regenerator 30 comprises a regenerator vessel 40 comprising a lower chamber 42 and an upper chamber 44. The catalyst regenerator may be a two-stage regenerator in which air is delivered to the upper chamber 44 and the lower chamber 42. In a two-stage regenerator, about 20 to about 40 wt % of the air is delivered to the lower chamber 42. Oxygen depleted air from the lower chamber 42 and the balance of total air delivered to the catalyst regenerator 30 are delivered to the upper chamber 44. The spent catalyst is first delivered to the upper chamber 44. Partially regenerated catalyst is then passed downwardly to the lower chamber 42 to contact fresh air and finish the regeneration process. Although not depicted as such, it is also contemplated that the regenerator vessel comprises a bubbling bed type regenerator (one or two stage) in which the oxygen-containing combustion gas enters the vessel below the bed of regenerated catalyst and passes up through the catalyst bed.

Returning to FIG. 1, in the combustor regenerator 30 spent catalyst enters the lower chamber 42, called the combustion chamber, in which coke is combusted from the catalyst and catalyst and flue gas are transported from the lower chamber 42 to the upper chamber 44, called the disengaging chamber. A primary separator, such as a disengager 50, initially separates catalyst from flue gas. One or more regenerator cyclones 52, 54, or other means, remove entrained catalyst particles from the rising flue gas before the flue gas exits the vessel through the flue gas outlet 38. Combustion of coke from the catalyst particles raises the temperature of the catalyst. Disengaged catalyst collects in a dense bed 56 which is fluidized by air from distributor 58. Disengaged catalyst may exit from the regenerator vessel through a regenerated catalyst outlet 16 to a regenerator standpipe 18. The catalyst may pass, regulated by a control valve, through the regenerator standpipe 18 to the lower section 14 of the riser 20.

Regenerated catalyst will usually have a temperature in a range from about 649° and about 760° C. (1200° to 1400° F.). If air is used as the oxygen-containing gas, the dry air rate to the regenerator may be between about 8 and about 15 kg/kg coke. The hydrogen in coke may be between about 4 and about 8 wt %, and the sulfur in coke may be between about 0.6 and about 3.0 wt %.

In order to cool the regenerated catalyst, the hot regenerated catalyst may be passed to a cooling zone having at least one catalyst cooler 100. Hot regenerated catalyst is transferred from the regenerator 30 through a first passage 102 and cooled regenerated catalyst is returned to the regenerator 30 through a second passage 104. At least one heat exchanger 106 is located in the catalyst cooler 100 in at least one of the first passage 102 and the second passage 104 to cool the catalyst before it is withdrawn from the catalyst cooler 100. The catalyst cooler 100 may be "cold-walled" meaning that a metal shell 108 of the catalyst cooler 100 is coated with an inner insulative refractory lining. However, in an embodiment, the shell 108 may be constructed without an insulative refractory lining (and be considered "hot-walled"). Additionally, parts of the catalyst cooler 100 may be additionally lined with an abrasion resistant coating. The shell 108 of the catalyst cooler 100 may be made of stainless steel In FIGS. 2A and 2B, the first passage 102 comprises a first conduit 202 and the second passage 104 comprises a second conduit 204. In a preferred embodiment, one of the conduits 202, 204 is disposed within the other conduit 202, 204 with an outer wall 205 of the inner conduit 204 separating the first passage 102 from the second passage 104. In a most preferred embodiment, the second passage 104 is disposed within the first passage 102, and thus the second conduit 204 is disposed within the first conduit 202. Although not depicted as such, as will be appreciated, the first passage 102 may be disposed within the second passage 104. In either case, the outer passage will be defined in an annulus is created by an outer wall of inner passage and an outer wall of the outer passage. Preferably, the at least one heat exchanger 106 is disposed within the annulus.

Returning to FIGS. 2A and 2B, the hot regenerated catalyst will flow from the regenerator through the first passage 102. The at least one heat exchanger 106 will remove heat from the catalyst as the catalyst falls through the first passage 102 towards the bottom of the at least one heat exchanger 106. Lift air, passed into the catalyst cooler 100 via an inlet 206 and though a conduit 208 to an outlet 210, will carry the cooled regenerated catalyst upward through the second passage 104 and into the regenerator, 30 and more preferably into the catalyst bed 56 in the regenerator 30. As shown, the second passage 104 may terminate in an arm 212 with a plurality of openings 214 which distribute the cooled catalyst into the catalyst bed 56.

Figures 2A, 2B:
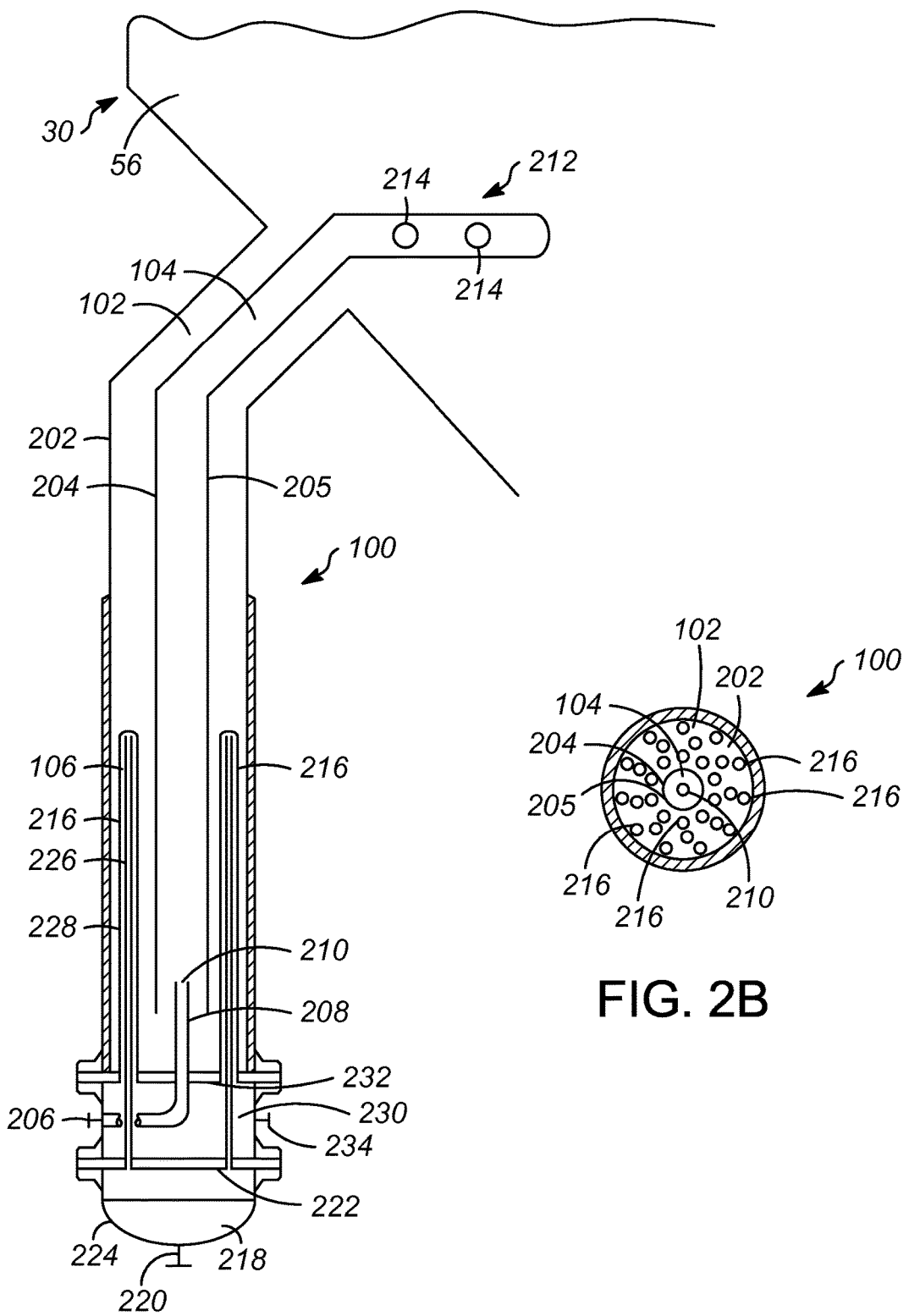
FIG. 2A shows a side perspective schematic view of a catalyst cooler according to one or more embodiments of the present invention.
FIG. 2B shows a top view of the catalyst cooler shown in FIG. 2A.

As shown in FIG. 2A, the at least one heat exchanger 106 comprises a heat exchange tube 216 having a cooling heat exchange fluid. It is preferred that a plurality heat exchange tubes 216 are utilized. In an embodiment, boiler feed water is the heat exchange fluid (i.e., a steam generator), but other types of heat exchange fluid are contemplated including water with additives to affect the boiling point of the fluid. The heat exchange tubes 216 may be made of a chromium-molybdenum-iron alloy because it is resistant to corrosion from trace chlorides in the boiler feed water if used as the heat exchange liquid.

In an exemplary embodiment, boiler feed water enters an inlet manifold 218 through cooling medium nozzle 220 at or near the bottom of the catalyst cooler 100. In an embodiment, the inlet manifold 218 is defined between a lower tube sheet 222 and a bottom head 224 of the cooler. Preferably, heat exchange tubes 216 have an inlet and an outlet at or near the bottom of the catalyst cooler 100. The heat exchange tubes 216 are preferably bayonet-style tubes which each comprise an inner tube 226 and an outer tube 228. The inner tube 226 extends into and through a majority length of the outer tube 228. The inner tube 226 of heat exchange tube 216 is secured to, extends through and projects from the lower tube sheet 222. Inlets of inner tubes 226 fluidly communicate with inlet manifold 218. Boiler feed water entering inlet manifold 218 is directed up inner tube 226 of heat exchange tube 216. Boiler feed water travels up the length of the inner tube 226 and exits outlets of inner tubes 226. The boiler feed water then reverses direction and flows down the outer tube 228 which surrounds inner tube 226. The catalyst contacts an outer surface of outer tube 228 of catalyst heat exchange tubes 216. In one or more embodiments, the catalyst heat exchange tubes 216 will have a longitudinal axis that is parallel to the flow of the catalyst in the first passage 102, the second passage 104, or both.

Heat from the catalyst is indirectly exchanged with boiler feed water in outer tubes 228. The indirect heat exchange raises the temperature of the boiler feed water in outer tubes 228 and converts at least a portion of it to steam. This contact with outer tubes 228 lowers the temperature of the catalyst descending in the catalyst cooler 100. The heated boiler feed water and steam from outer tubes 228 are directed out of outlets of outer tubes 228 and into outlet manifold 230 defined between upper tube sheet 232 and the lower tube sheet 222 in the catalyst cooler 100. Outer tubes 228 are secured to, extend through and project from upper tube sheet 232. Outlets of outer tubes 228 fluidly communicate with outlet manifold 230. Fluid in outlet manifold 230 is then transported out of the catalyst cooler 100 through nozzle 234 which may use the steam to transfer heat to another process fluid elsewhere. It should be appreciated that other heat exchangers 106 may be used in association with the present invention.

Turning to FIGS. 3A and 3B, another catalyst cooler according to one or more embodiments of the present invention is shown in which is shown. In this catalyst cooler 100, the first passage 102 comprises a first portion 300a of the shell 108 of the catalyst cooler 100 (when view of the top (see, FIG. 3B) and the second passage 104 comprises a second portion 300b. In other words, the catalyst cooler 100 has a circular horizontal cross section and the first passage 102 and the second passage 104 each occupy a portion of the cross section. In this embodiment, the first portion 300a occupies more of the horizontal cross section than the second portion 300b. The first portion 300a and the second portion 300b may be separated by a vertical wall 302 or baffle.

The at least one heat exchanger 106 is are disposed within at least the first passage 102. In this embodiment, the inlet 206 for the lift gas is disposed in a side portion of the catalyst cooler 100 above the outlet manifold 230 for the heat exchanger tube 216.

The remaining portions of this embodiment are similar to the embodiment shown in FIGS. 2A and 2B, and therefore, include similar reference numbers with the understanding that the above description is applicable to this embodiment.

In contrast to the embodiment of FIGS. 3A and 3B, in the embodiment of FIGS. 4A and 4B, the second portion 300b of the horizontal cross section (see FIG. 4B), which comprises the second passage 104 is larger than the first portion 300a which comprises the first passage 102.

In this embodiment, the first passage 102 includes a hopper 400 for passing catalyst into the catalyst cooler 100, and the second passage 104 terminates in an outlet 402. In this embodiment, the at least one heat exchanger 106 is disposed in the second passage 104. Accordingly, the inlet 206 for the lift gas communicate to one or more outlets 210 for the lift gas, via conduit 208, which is disposed between the heat exchangers 106.

The remaining portions of this embodiments are similar to the previous embodiments and therefore include similar reference numbers with the understanding that the above descriptions are applicable to this embodiment.

The catalyst coolers according to any of these embodiments are believed to provide an effective and efficient design for cooling catalyst without requiring an external standpipe in a regenerator of an FCC unit. In addition, the catalyst coolers should require less space without the external standpipe.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A regenerator for regenerating spent catalyst particles, the regenerator comprising:
   an inlet for spent catalyst particles;
   an outlet for regenerated catalyst particles;
   a gas distributor disposed below a bed of catalyst particles configured to supply combustion gas into the regenerator for combusting coke on the spent catalyst particles to provide the regenerated catalyst particles; and,
   a cooling zone for removing heat from regenerated catalyst, the cooling zone comprising a first passage for receiving regenerated catalyst, a second passage for returning cooled regenerated catalyst to the regenerator, and at least one heat exchanger for removing heat from the regenerated catalyst, wherein each heat exchanger in the cooling zone is disposed in at least one of the first passage and the second passage.

2. The regenerator of claim 1 wherein the first passage comprises a conduit disposed within the second passage.

3. The regenerator of claim 1 wherein the second passage comprises a conduit disposed within the first passage.

4. The regenerator of claim 1 wherein the first passage and the second passage each comprise a portion of a single shell.

5. The regenerator of claim 1 wherein each heat exchanger includes a longitudinal axis, and wherein the longitudinal axis of each heat exchanger is generally parallel to a flow path of the regenerated catalyst through the first passage.

6. The regenerator of claim 1, wherein the catalyst cooler further comprises an outlet for a lift gas.

7. The regenerator of claim 6, wherein the outlet is disposed within the second passage.

8. The regenerator of claim 1, wherein the second passage includes an arm with a plurality of outlets for dispensing cooled catalyst into the regenerator.

9. The regenerator of claim 1, wherein the least one heat exchanger comprises steam generators.

10. A regenerator for regenerating spent catalyst particles, the regenerator comprising:
    an inlet for spent catalyst particles;
    an outlet for regenerated catalyst particles;
    a gas distributor disposed below a bed of catalyst particles configured to supply combustion gas into the regenerator for combusting coke on the spent catalyst particles to provide the regenerated catalyst particles; and,
    a catalyst cooler disposed beneath the bed of catalyst particles, the catalyst cooler comprising a first passage for hot regenerated catalyst, at least one heat exchanger for removing heat from the hot regenerated catalyst to provide a cooled regenerated catalyst, and a second passage for passing the cooled regenerated catalyst to the bed of catalyst particles.

11. The regenerator of claim 10, wherein the catalyst cooler further comprises an inlet for lift gas configured to transport the cooled regenerated catalyst to the bed of catalyst particles.

12. The regenerator of claim 10, wherein the second passage includes an arm disposed in the bed of catalyst particles.

13. The regenerator of claim 10, wherein the second passage is disposed within the first passage so as to define an annulus.

14. The regenerator of claim 13 wherein the at least one heat exchanger is disposed within the annulus.

15. The regenerator of claim 10 wherein the second passage is disposed within the first passage, and the at least one heat exchanger is disposed within the first passage.

16. The regenerator of claim 10 wherein the catalyst cooler has a circular horizontal cross-section, and the first passage and the second passage each comprise a portion of the of the circular horizontal cross-section separated by a baffle.

17. The regenerator of claim 16 wherein the first passage and the second passage have differently sized horizontal cross sections.

* * * * *